Dec. 8, 1959   D. W. VAN GELDER   2,916,515
GLUCONIC ACID MONOHYDRATE
Filed Sept. 16, 1957
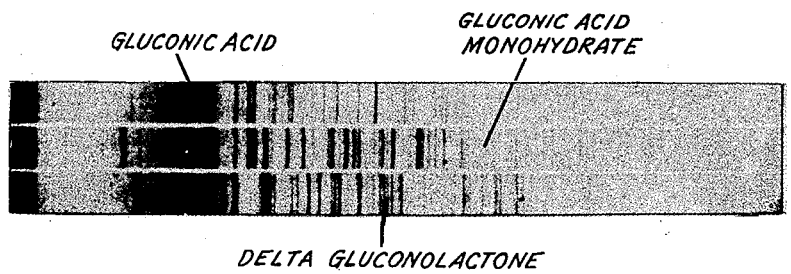
Inventor
DIRK WILLEM VAN GELDER
By Stevens, Davis, Miller & Mosher
Attorneys

United States Patent Office 2,916,515
Patented Dec. 8, 1959

2,916,515

GLUCONIC ACID MONOHYDRATE

Dirk W. van Gelder, Maasniel, Netherlands, assignor to Koninklijke Industrieele Maatschappij voorheen Noury & Van Der Lande N.V., Deventer, Netherlands Application September 16, 1957, Serial No. 684,247

Claims priority, application Netherlands September 17, 1956

12 Claims. (Cl. 260—535)

The invention relates to a process for the preparation of gluconic acid monohydrate. More particularly the invention relates to a method of crystallizing gluconic acid monohydrate from solutions thereof.

In an aqueous solution of gluconic acid and isomers of lactones, the lactones are in a state of equilibrium with the gluconic acid. The isomers are the so-called gamma-gluconolactone and delta-gluconolactone which are best known. It has been discovered that equilibrium between gluconic acid and its delta lactone is set up relatively easily. On the other hand, the equilibrium between these compounds and the gamma lactone is established considerably more slowly, depending upon the temperature. For the sake of brevity, solutions of these compounds in water, whether or not in a state of equilibrium, will be referred to hereinafter as gluconic acid solutions.

A number of processes have been proposed for separating the three above-mentioned substances from aqueous solutions in a crystalline form. Particularly industry has shown considerable interest in the crystallization of gluconic acid and delta-lactone.

The preparation of these compounds is not a simple process by any means. A number of difficulties are encountered when gluconic acid or delta lactone are to be separated from solutions which are contaminated, as is frequently the case when producing these compounds or the chemical substances to be made therefrom.

Gluconic acid crystallizes in the form of fine and fragile needles which have incorporated therein large quantities of mother liquor and form a compact layer when subjected to centrifugal action. Even liquids which are concentrated to a small extent coagulate as a whole to a solid mass. It has, therefore, not appeared possible to prepare pure gluconic acid from technical mother liquid by an easy method.

As a matter of fact, the delta lactone has a better crystalline structure than the gluconic acid. However, the delta lactone has the disadvantage that it is meta-stable as compared with solid gluconic acid at temperatures about 60–70° C.

In this specification, the terms "stable" and "meta-stable" refer to a phase relationship. This means, for instance, that at low temperatures the saturated solution of delta lactone is in a meta-stable equilibrium as compared with crystalline gluconic acid which is also present. The lactone is "less stable" i.e., "meta-stable," than the gluconic acid. In such circumstances, the preparation of crystalline delta lactone is only possible in the complete absence of nuclei crystals of gluconic acid. The latter, if present, would grow at the cost of the lactone and in that case the same difficulties would be encountered as described above for the crystallization of gluconic acid.

It has been discovered that crystallization of the delta lactone also does not take place in a satisfactory manner when the ambient conditions are above 50° C. In such a case, the mother liquor is too viscous to be worked up in a satisfactory way. In the case of contaminated liquids an incomplete washing results in the centrifuge and an impure product results. By the term mother liquor refers to the residual saturated liquid which remains after the crystallization of a portion of a liquid or solution.

Many stringent and exact conditions must be followed in order to obtain good and reliable results concerning delta-gluconolactone. In other words, the so-called meta-stability of delta-gluconolactone at low temperatures and the viscosity of the mother liquid at high temperatures makes available only a narrow range of conditions of temperature and concentration at which a good preparation of delta lactone may be obtained.

It has now been found that, at temperatures lying between the freezing point of the solution and 30° C., a crystalline product may be separated which has not been known previously in the art and which is more stable than gluconic acid and the delta-gluconolactone at an extensive temperature-range. Furthermore, it has a crystalline structure which enables it to be worked up in the centrifuge in an easy manner. Saturated solutions of this product, in the temperautre-range within which it is stable, have a viscosity which differs only slightly from that of water and which, in any case, does not cause any difficulties with its manufacture.

According to an alkalimetric titration the new product has the empirical formula: $C_6H_{12}O_7 \cdot H_2O$. It is therefore referred to as "gluconic acid monohydrate." A good crystallization of technical gluconic-acid solutions is possible for the first time, as neither an undesired crystallization of anhydrous gluconic acid, nor a too high viscosity of the mother liquor disturbs the manufacture. The crystalline structure is excellently suitable for draining the mother liquor.

The gluconic acid monohydrate is formed slowly when solid gluconic acid is stirred with water at temperatures of about 0° C. According to the invention, however, the preparation may be prepared best by inoculating a gluconic acid solution having a concentration of 25–70% and in the temperature range of between the freezing point of the solution and 30° C. The solution is inoculated with a quantity of gluconic acid monohydrate crystals. These crystals may be obtained by manual selection from a gluconic acid solution. The crystals will grow and increase relatively rapidly. They may be removed from the saturated liquid by centrifuging more quickly than the above-mentioned well-known gluconic acid crystals or gluconolactones.

Accordingly, it is an object of the present invention to provide a method for producing gluconic acid monohydrate.

It is another object of this invention to provide a method for obtaining gluconic acid monohydrate from solutions of gluconic acid.

Additional objects and advantages of the present invention will become apparent from a detailed consideration of the following description.

Preferably, the process is carried out below the "transition point" of the hydrate. This means the temperature at which the hydrate is in equilibrium with solid gluconic acid and saturated solution. This temperature has been found to be about 23° C. This has the advantage that a possible initial crystallization of gluconic acid, which might take place at a high concentration of the solution to be crystallized, cannot cause a permanent disturbance, because, this product is converted into the hydrate form at the end of the process.

The gluconic acid solution used in the present invention may be obtained by dissolving such well-known compounds as gluconic acid, delta-gluconolactone or gamma-gluconolactone in water. As these compounds come into a state of equilibrium with each other in the aqueous solution there is, in principle, no difference as to which is chosen. The solution may be obtained as a result of one or more chemical reactions. A glucose solution may be oxidized to gluconic acid for example, with the aid of oxidizing agents such as bromine or hydrogen peroxide, or by a biochemical or electrochemical method.

It is a feature that the gluconic acid concentration of the crystallizing solution must be above the solubility value of the gluconic acid hydrate at the operating temperature. It has been found that a minimum concentration may be fixed at about 20%.

The gluconic acid monohydrate obtained consists of thin plate-shaped crystals, which may be as large as 0.5–1 mm. lengthwise. They are readily soluble in water. The solution obtained shows all the reactions of gluconic acid and possesses an acid flavor. The solubility in water at 0° C. is 22 percent by weight (expressed as $C_6H_{12}O_7$). Above 23° C., the solubility may not be determined so easily; in such an instance the hydrate is meta-stable as compared with solid gluconic acid. The X-ray diffraction pattern of the gluconic acid monohydrate is quite different from anhydrous gluconic acid and delta-gluconolactone. The accompanying drawing illustrates the X-ray diffraction patterns of gluconic acid, gluconic acid monohydrate, and delta-gluconolactone. The gluconic acid monohydrate is a homogeneous matter of definite composition with a characteristic crystalline structure.

When heated to 30°–45° C., the gluconic acid monohydrate loses its water of crystallization resulting in gluconic acid. Upon dehydration, the crystals retain their form, but they become opaque. The melting point of gluconic acid monohydrate is 85° C.

If it is found desirable to utilize the gluconic acid monohydrate as such, it must be dried at a temperature below 30° C. On the other hand, the hydrate form may be intentionally converted into the anhydrous gluconic acid form by heating to 40–45° C. or even higher. The gluconic acid obtained in such a manner, in a chemical sense is identical with the product directly obtained from a gluconic acid solution. However, the structure of the crystals is different. By heating gluconic acid hydrate at a still higher temperature, delta-gluconolactone may be obtained.

The following example is illustrative of the invention which is not to be construed as placing limitations on the scope other than as set forth in the appended claims.

*Example*

A solution of 200 g./l. of glucose was oxidized with the aid of acetobacter suboxydans to gluconic acid in the presence of small quantities of nutritious matter, under aeration. Thereafter, the liquid was filtered and evaporated under vacuum to a concentration of 30–40% $C_6H_{12}O_7$.

Following this, the solution was cooled while being stirred to a temperature of −2° to +2° C. At this temperature the solution was inoculated with one gram of gluconic acid monohydrate crystals per 100 grams of the solution. The mixture was agitated for a day after which time a big mass of gluconic acid hydrate crystals had been found. Half the resulting mixture was charged into a centrifuge. By means of the centrifuge the mother liquor was drained and the crystal mass was freed from the last remainder of impurities. The mother liquor, together with fresh liquid was concentrated to a content of 40–60% $C_6H_{12}O_7$ and fed to a crystallization vessel. The introduction into the crystallization vessel took place at a rate so that the gluconic acid concentration of the crystallizing mass was continuously kept between 30 and 40% $C_6H_{12}O_7$. In cooling, care was taken that the temperature remained about 0° C. The process was continuously operated so that at intervals, after a mass of gluconic acid hydrate crystals had formed, half of the contents of the crystallization vessel were passed to the centrifuge so that the impurities and mother liquid could be separated from the resulting crystals.

The crystals obtained in the centrifuge contained 5% free moisture. In order to free the crystals from the moisture the crystals were subjected to air having a temperature of 25–30° C. The dried product consisted of opaque crystal plates, which, according to the X-ray test were found to be free from gluconic acid and delta-gluconolactone. By titrating with lye the crystals showed a content of about 100% gluconic acid monohydrate. The titration was carried out by weighing a small amount of the crystals which were then dissolved in water. To the solution a small excess of 0.1 N sodium hydroxide was added. The solution obtained was back titrated with hydrochloric acid in the presence of phenolphthalein.

The gluconic acid monohydrate produced may be used for the usual purposes for which hitherto gluconic acid or delta-gluconolactone has been applied. When the product is dissolved in water it has the same properties as the latter compounds. The product may be used in the preparation of gluconic acid salts, such as those of calcium, sodium, copper, and manganese. These salts may be easily prepared by admixing the gluconic acid monohydrate to a solution or a suspension of the metal oxides or metal hydroxides. The desired salt may be then obtained by evaporation.

It will be apparent that many changes and modifications of the several features of the process described herein may be made without departing from the spirit and scope of the invention. It is, therefore, to be understood that the foregoing description is by way of illustration of the invention rather than limitation upon the invention.

What is claimed is:

1. A method for producing gluconic acid monohydrate which comprises inoculating an aqueous solution of gluconic acid with crystals of gluconic acid monohydrate, maintaining the resulting mixture at a temperature of between the freezing point of the solution and about 30° C., stirring the said mixture for a sufficient period of time to effect crystallization of gluconic acid monohydrate.

2. The method of claim 1 wherein the aqueous solution has a concentration of at least 20% by weight of gluconic acid.

3. A method for producing gluconic acid monohydrate which comprises inoculating an aqueous solution of gluconic acid with crystals of gluconic acid monohydrate, maintaining the resulting mixture at a temperature of below the transition point of gluconic acid monohydrate, stirring the said mixture for a sufficient period of time to effect crystallization of gluconic acid monohydrate.

4. The method of claim 3 wherein the aqueous solution has a concentration of at least 20% by weight of gluconic acid.

5. A method for producing gluconic acid monohydrate which comprises inoculating an aqueous solution of gluconic acid with crystals of gluconic acid monohydrate, maintaining the resulting mixture at a temperature of not more than 23° C., stirring the said mixture for a sufficient period of time to effect crystallization of gluconic acid monohydrate.

6. The method of claim 5 wherein the aqueous solution has a concentration of at least 20% by weight of gluconic acid.

7. A method for producing gluconic acid monohydrate which comprises inoculating an aqueous solution of gluconic acid with crystals of gluconic acid monohydrate, maintaining the resulting mixture at a temperature between the freezing point of the solution and about 30° C., stirring the said mixture for a sufficient period of time to effect crystallization of gluconic acid monohydrate, separating the crystals of gluconic acid monohydrate from the resulting mother liquor, employing the mother liquor in a subsequent crystallization of gluconic acid monohydrate.

8. The method of claim 7 wherein the aqueous solution has a concentration of at least 20% by weight of gluconic acid.

9. A method for producing gluconic acid monohydrate which comprises inoculating an aqueous solution of gluconic acid with crystals of gluconic acid monohydrate, maintaining the resulting mixture at a temperature between the freezing point of the solution and about 30° C., stirring the said mixture for a sufficient period of time to effect crystallization of gluconic acid monohydrate, separating the crystals of gluconic acid monohydrate from the resulting mother liquor, adjusting the mother liquid to a concentration of between about 40-60% gluconic acid, employing the mother liquor in a subsequent crystallization of gluconic acid monohydrate.

10. The process of claim 9 wherein the solution is maintained at a temperature of below the transition point of gluconic acid monohydrate.

11. The process of claim 10 wherein the solution is maintained at a temperature of not more than 23° C.

12. As a compound, crystalline gluconic acid monohydrate having the formula $C_6H_{12}O_7 \cdot H_2O$.

References Cited in the file of this patent

UNITED STATES PATENTS

| 1,942,660 | Pasternack et al. | Jan. 9, 1934 |
| 1,985,255 | Isbell | Dec. 25, 1934 |